(12) United States Patent
Jung

(10) Patent No.: US 12,028,350 B2
(45) Date of Patent: Jul. 2, 2024

(54) APPARATUS FOR ELECTRONIC CONTROL OF VEHICLE, APPARATUS FOR GATEWAY AND VEHICLE INCLUDING THE SAME

(71) Applicants: Hyundai Motor Company, Seoul (KR); Kia Corporation, Seoul (KR)

(72) Inventor: Ho Jin Jung, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 339 days.

(21) Appl. No.: 17/517,301

(22) Filed: Nov. 2, 2021

(65) Prior Publication Data

US 2022/0321576 A1    Oct. 6, 2022

(30) Foreign Application Priority Data

Mar. 31, 2021    (KR) .................. 10-2021-0042172

(51) Int. Cl.
*H04L 9/40*    (2022.01)
*H04L 9/32*    (2006.01)

(52) U.S. Cl.
CPC .......... *H04L 63/123* (2013.01); *H04L 9/3242* (2013.01); *H04L 2209/84* (2013.01)

(58) Field of Classification Search
CPC ............................ H04L 63/123; B60R 16/023
See application file for complete search history.

(56) References Cited

U.S. PATENT DOCUMENTS

| | | | |
|---|---|---|---|
| 9,729,535 B2 | 8/2017 | Lee et al. | |
| 10,142,311 B2 | 11/2018 | Oshida | |
| 2016/0099926 A1* | 4/2016 | Lee | H04L 63/08 726/7 |
| 2016/0255065 A1* | 9/2016 | Oshida | H04L 69/324 726/3 |
| 2017/0338961 A1* | 11/2017 | Cho | H04L 9/3242 |
| 2017/0339115 A1* | 11/2017 | Cho | H04W 12/062 |
| 2021/0078534 A1* | 3/2021 | Stitt | H04W 4/40 |
| 2022/0321576 A1* | 10/2022 | Jung | H04L 63/123 |

FOREIGN PATENT DOCUMENTS

| | | | |
|---|---|---|---|
| EP | 3062476 A1 * | 8/2016 | ......... H04L 61/6022 |
| JP | 6420176 B2 | 11/2018 | |
| KR | 101596753 B1 | 2/2016 | |
| KR | 101651648 B1 | 8/2016 | |

* cited by examiner

*Primary Examiner* — Ponnoreay Pich
(74) *Attorney, Agent, or Firm* — Fox Rothschild LLP

(57) ABSTRACT

A vehicle may include an electronic control apparatus of the vehicle that encrypts data, generates an encrypted message including the encrypted data and a message authentication code (MAC) of the encrypted data, and transmits the encrypted message and identification information corresponding to the encrypted message to another apparatus. The vehicle also includes a gateway apparatus that receives the encrypted message and the identification information, determines whether the identification information is identical to pre-stored identification information, generates a MAC of the encrypted data, determines whether the generated MAC is identical to the MAC obtained from the encrypted message, and routes the encrypted message based on the determination result.

15 Claims, 6 Drawing Sheets

APPARATUS FOR ELECTRONIC CONTROL OF VEHICLE, APPARATUS FOR GATEWAY AND VEHICLE INCLUDING THE SAME

CROSS-REFERENCE TO RELATED APPLICATION

This application claims under 35 U.S.C. § 119(a) the benefit of Korean Patent Application No. 10-2021-0042172, filed in the Korean Intellectual Property Office on Mar. 31, 2021, the entire contents of which are incorporated herein by reference.

BACKGROUND

(a) Technical Field

The present disclosure relates to an electronic control apparatus of a vehicle, a gateway device, and a vehicle including the same.

(b) Description of the Related Art

To ensure confidentiality of messages to be transmitted, an electronic control apparatus of a vehicle encrypts important messages. However, because only electronic control apparatuses that receive or transmit encrypted messages share a decryption key, a gateway apparatus is incapable of identifying the encrypted messages.

Accordingly, the gateway apparatus is incapable of performing a process of decrypting encrypted messages. When the gateway apparatus routes the encrypted message without verifying the encrypted message, an external intrusion message that is counterfeit and potentially dangerous to a vehicle may be allowed on a vehicle network. Accordingly, the external intrusion message may result in injury to vehicle occupants or property damage.

SUMMARY

An aspect of the present disclosure provides an electronic control apparatus of a vehicle that is capable of determining whether to allow or block the routing of an encrypted message, by verifying the encrypted message, a gateway device, and a vehicle including them.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle may include an electronic control apparatus of the vehicle that encrypts data, generates an encrypted message including the encrypted data and a message authentication code (MAC) of the encrypted data, and transmits the encrypted message and identification information corresponding to the encrypted message to another apparatus and a gateway apparatus that receives the encrypted message and the identification information, determines whether the identification information is identical to pre-stored identification information, generates the MAC of the encrypted data, determines whether the generated MAC is identical to a MAC obtained from the encrypted message, and routes the encrypted message based on the determination result.

According to an embodiment, the electronic control apparatus of the vehicle may generate the encrypted message so as to further include counter information.

According to an embodiment, the gateway apparatus may block routing of the encrypted message when the gateway apparatus determines that the identification information is different from the pre-stored identification information.

According to an embodiment, the gateway apparatus may block routing of the encrypted message when the gateway apparatus determines that the generated MAC is different from the MAC obtained from the encrypted message.

According to an embodiment, the gateway apparatus routes the encrypted message when the gateway apparatus determines that the generated MAC is identical to the MAC obtained from the encrypted message.

According to an aspect of the present disclosure, an electronic control apparatus of a vehicle may include a message generating device that encrypts data by using a first key and generates an encrypted message including the encrypted data a MAC generated by using the encrypted data and a second key different from the first key and a communication device that transmits the encrypted message and identification information corresponding to the encrypted message to another apparatus.

According to an embodiment, the first key may be a shared secret key (SSK) with the other apparatus, and the second key may be a vehicle shared key (VSK).

According to an embodiment, the message generating device may generate the encrypted message so as to further include counter information.

According to an aspect of the present disclosure, a gateway apparatus may include a communication device that receives an encrypted message including encrypted data and MAC and identification information corresponding to the encrypted message, a determination device that determines whether the identification information is identical to pre-stored identification information, generates a MAC by using a pre-stored third key and the encrypted data obtained from the encrypted message, and determines whether the generated MAC is identical to a MAC obtained from the encrypted message, and a message processor that routes the encrypted message based on the determination result of the determination device.

According to an embodiment, the third key may be a VSK

According to an embodiment, the message processor may block routing of the encrypted message when the determination device determines whether the identification information is different from the pre-stored identification information.

According to an embodiment, the message processor may block routing of the encrypted message when the determination device determines whether the generated MAC is different from the MAC obtained from the encrypted message.

According to an embodiment, the message processor may route the encrypted message when the determination device determines whether the generated MAC is identical to the MAC obtained from the encrypted message.

According to an embodiment, the encrypted message may further include counter information.

According to an embodiment, the message processor may route the encrypted message and increases the counter information when the determination device determines whether a counter value included in the encrypted message is greater than a counter value corresponding to the prestored identification information.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
FIG. 1 is a block diagram illustrating a vehicle including an electronic control apparatus and a gateway apparatus, according to an embodiment disclosed in the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In adding reference numerals to components of each drawing, it should be noted that the same components have the same reference numerals, although they are indicated on another drawing. In describing the embodiments of the present disclosure, detailed descriptions associated with well-known functions or configurations will be omitted when they may make subject matters of the present disclosure unnecessarily obscure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

FIG. 1 is a block diagram illustrating a vehicle, according to an embodiment disclosed in the specification.

Referring to FIG. 1, a vehicle 1000 may include an electronic control apparatus 100 of the vehicle 1000 and a gateway apparatus 200. The electronic control apparatus 100 of the vehicle 1000 may generate an encrypted message and may transmit the encrypted message to another device (e.g., another electronic control apparatus). The gateway apparatus 200 may determine whether to route the encrypted message.

The electronic control apparatus 100 and the gateway apparatus 200 may communicate with each other by using a controller area network (CAN) communication technology. Herein, the CAN communication may be defined as a standard communication specification designed to communicate between electronic control units (ECUs) of a vehicle without a host computer within the vehicle. The CAN communication may use a method of allocating a CAN ID (identifier) depending on a priority of a message rather than exchanging messages depending on an address of a node, and identifying the message by using the CAN ID.

For example, when an electronic control apparatus of any vehicle transmits a message, each of the remaining electronic control apparatuses of the vehicle may determine whether the message transmitted by the electronic control apparatus of any vehicle is a necessary message, based on the CAN ID. When the transmitted message is a necessary message, each of the remaining electronic control apparatuses of the vehicle may receive the transmitted message. When the transmitted message is an unnecessary message, each of the remaining electronic control apparatuses of the vehicle may ignore the transmitted message.

The electronic control apparatus 100 of the vehicle 1000 may encrypt data. For example, the electronic control apparatus 100 of the vehicle 1000 may encrypt data by using a secure application shared key (SSK) that is a secret key that is shared by only corresponding electronic control apparatuses that transmit and receive data.

The electronic control apparatus 100 may generate an encrypted message including a message authentication code (MAC) of encrypted data and encrypted data. Herein, the MAC may be defined as information transmitted together with a message to verify message integrity and message authentication. The message integrity indicates that the transmitted message is not changed. The message authentication indicates that the transmitted message comes from the correct sender.

For example, the electronic control apparatus 100 may generate a MAC in a form of a hash message authentication code (HMAC) generated by entering the encrypted message and a vehicle shared key (VSK) into a hash function or cipher-based MAC (CMAC) generated by entering a message and VSK into a symmetric key algorithm.

The electronic control apparatus 100 may generate the encrypted message including the encrypted data and the MAC generated by using the encrypted data.

The electronic control apparatus 100 may transmit, to another device, an encrypted message and identification information corresponding to the encrypted message. Herein, the identification information corresponding to the encrypted message may be, for example, a CAN ID that is the ID of a CAN message.

The electronic control apparatus 100 may generate the encrypted message so as to further include counter information. Herein, the counter may be defined as a register or a memory device used to indicate the number of times that a specific event occurs. When the next input signal or input pulse is received in an existing state, the counter may memorize a new value by increasing an existing value by one. For example, the electronic control apparatus 100 of the vehicle 1000 may increase a counter value by one whenever a message is transmitted, by further including the counter information in the encrypted message.

The gateway apparatus 200 of the vehicle 1000 may determine whether a counter value of the encrypted message received from the electronic control apparatus 100 is greater than a counter value of a previously-received encrypted message.

For example, when determining that the counter value of the received encrypted message is not greater than the counter value of the previously-received encrypted message, the gateway apparatus 200 may determine that the encrypted message is an intrusion signal for eavesdropping the MAC of the encrypted message, which is previously transmitted to the gateway apparatus 200, and then may block routing. Accordingly, the vehicle 1000 may further include counter information in the encrypted message by using the electronic control apparatus 100. The vehicle 1000 may verify the counter value of the encrypted message by using the gateway apparatus 200, thereby preventing a replay attack Herein, a replay attack may mean that, in a process of verifying MAC, a third party copies MAC by eavesdropping a network traffic, and then impersonates a legitimate user by transmitting the copied MAC to a network. That is, the replay attack may be defined as hacking the MAC of a vehicle through sniffing for eavesdropping a packet exchange of other parties on a network. Herein, when the counter value of the received encrypted message is not greater than the previously-stored counter value, the gateway apparatus 200 may determine that the received encrypted message is a message generated by sniffing the counter value of the encrypted message previously received by the gateway apparatus 200.

The vehicle 1000 may enable communication between electronic control apparatuses of a vehicle by using the gateway apparatus 200. For example, the gateway apparatus 200 may be defined as a software or hardware device that enables communication between networks using different communication protocols in a computer network. That is, a gateway may be defined as a device that connects different networks (heterogeneous networks) and acts as a passage between different networks.

Herein, the gateway apparatus 200 may receive an encrypted message, which is transmitted by the electronic control apparatus 100 of the vehicle 1000 to another device that shares an SSK, which is a security key for an encrypted message, with the electronic control apparatus 100 of the vehicle 1000. The gateway apparatus 200 may verify the encrypted message without a process of decrypting the encrypted message. When the verification is successful, the gateway apparatus 200 may route an encrypted message to the other device.

The gateway apparatus 200 may receive an encrypted message including encrypted data and MAC and identification information corresponding to the encrypted message. Herein, the identification information corresponding to the encrypted message may be, for example, CAN ID.

The gateway apparatus 200 may determine whether identification information is the same as previously-stored identification information. When determining that the identification information is different from the previously-stored identification information, the gateway apparatus 200 may block the routing of the encrypted message. For example, the vehicle 1000 may determine whether the previously-obtained CAN ID information of the encrypted message generated by the electronic control apparatus 100 of the vehicle 1000 is the same as CAN ID information of the received encrypted message.

The gateway apparatus 200 may generate a MAC by using encrypted data obtained from the encrypted message. For example, the gateway apparatus 200 may generate a MAC of encryption data by using the encryption data obtained from the encrypted message and a VSK, which is a vehicle shared key shared by all electronic control apparatuses in the vehicle 1000.

Herein, the gateway apparatus 200 may generate, for example, an HMAC for entering an encrypted message and a VSK into a hash function. Alternatively, the gateway apparatus 200 of the vehicle 1000 may generate CMAC by entering an encrypted message and a VSK into a symmetric key algorithm.

When determining that the generated MAC is different from the MAC obtained from the encrypted message, the gateway apparatus 200 may block the routing of the encrypted message.

When the gateway apparatus 200 determines that the generated MAC is the same as the MAC obtained from the encrypted message, the gateway apparatus 200 may route the encrypted message. Herein, the routing may be defined as a process of selecting an optimal path for transmitting given data at the shortest distance or during the shortest time when communication data is transmitted within a network.

Herein, the gateway apparatus 200 may be a central gateway (CGW). The CGW may be defined as a gateway for exchanging CAN messages between a plurality of CAN BUS such as body CAN BUS, powertrain CAN BUS, and chassis CAN BUS inside a vehicle. That is, the CGW may be defined as a device generated by integrating separate gateways for each CAN bus in a vehicle.

The vehicle 1000 may reduce the weight and complexity by replacing the complicated electric wiring and relay between the vehicle's electronic control apparatuses with a serial communication line by using the CGW, and may quickly transmit a large amount of multimedia data between the vehicle's electronic control apparatuses at once. Accordingly, the vehicle 1000 may improve transmission/reception speed and reliability.

Herein, the gateway apparatus 200 may be equipped with an intrusion detection system (IDS) that is an intrusion detection technology. The IDS may be defined as a network security system that collects and analyzes information about external intrusions, detects intrusion activities, and provides a notification of external intrusion so as to respond to the external intrusion. The IDS may detect intrusion signals, which are transmitted by unauthorized users such as hackers by manipulating the electronic control apparatus 100 of the vehicle 1000 or a vehicle network.

Hereinafter, operations of the vehicle 1000 including the electronic control apparatus 100 and the gateway apparatus 200 will be described in detail with reference to FIGS. 2-4.

Figure 2:
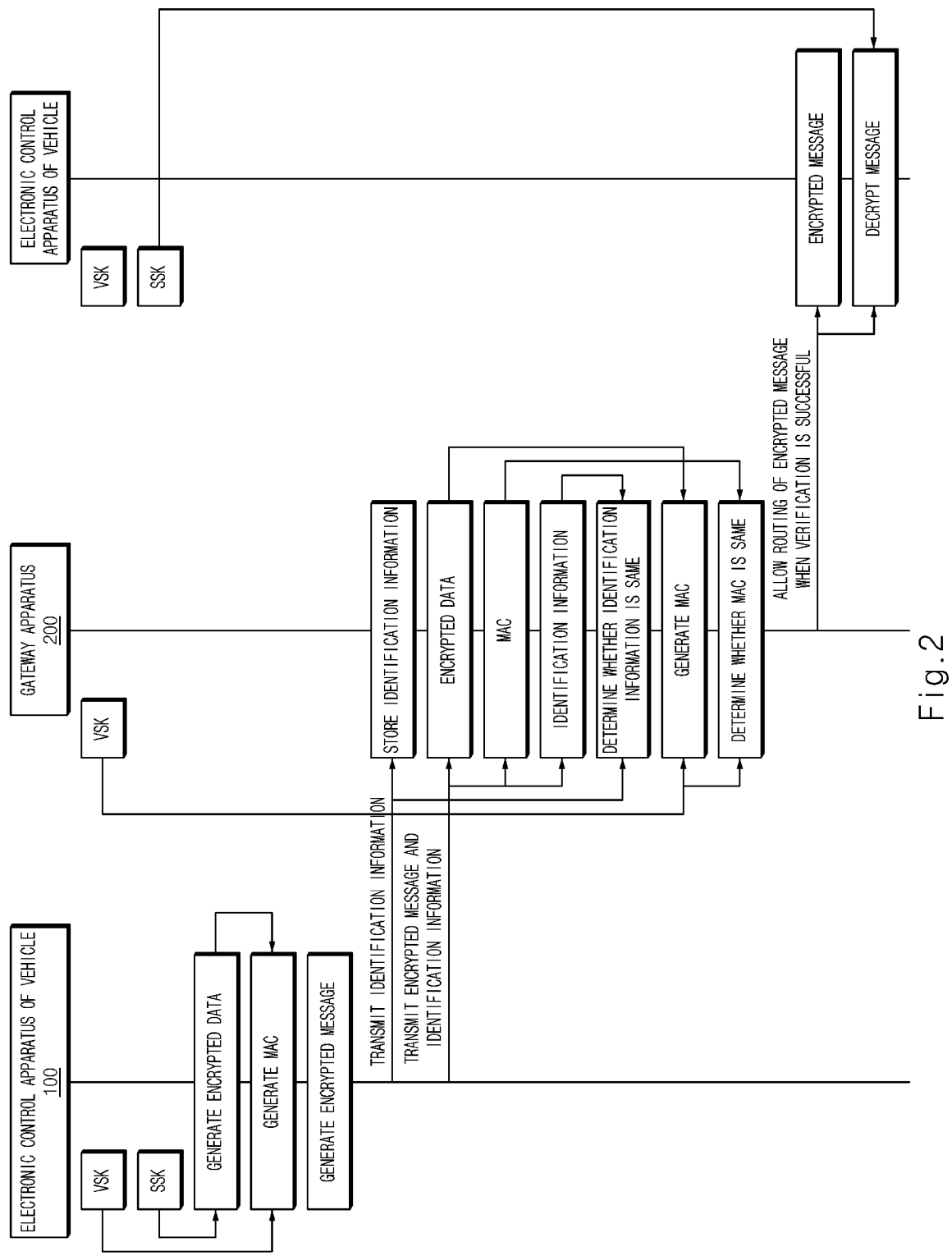
FIG. 2 is a view illustrating a response procedure for an encrypted message received from an electronic control apparatus of a vehicle, according to an embodiment disclosed in the specification.

FIG. 2 is a view illustrating a response procedure for an encrypted message received from an electronic control apparatus of a vehicle, according to an embodiment disclosed in the specification.

In FIG. 2, the electronic control apparatus 100 of the vehicle 1000 may generate encrypted data by using a SSK, and may generate a MAC by using encrypted data and a VSK The electronic control apparatus 100 of the vehicle 1000 may generate an encrypted message including encrypted data and a MAC and may transmit the encrypted message and identification information about the encrypted message.

In FIG. 2, the gateway apparatus 200 may determine whether identification information received from the electronic control apparatus 100 of the vehicle 1000 is the same as previously-stored identification information, and then may generate a MAC by using the VSK and the encrypted data. The gateway apparatus 200 may determine whether the MAC received from the electronic control apparatus 100 of the vehicle 1000 is the same as the generated MAC. Afterward, when the verification that the MAC is the same is successful, the gateway apparatus 200 may allow the routing of the encrypted message.

Figure 3:
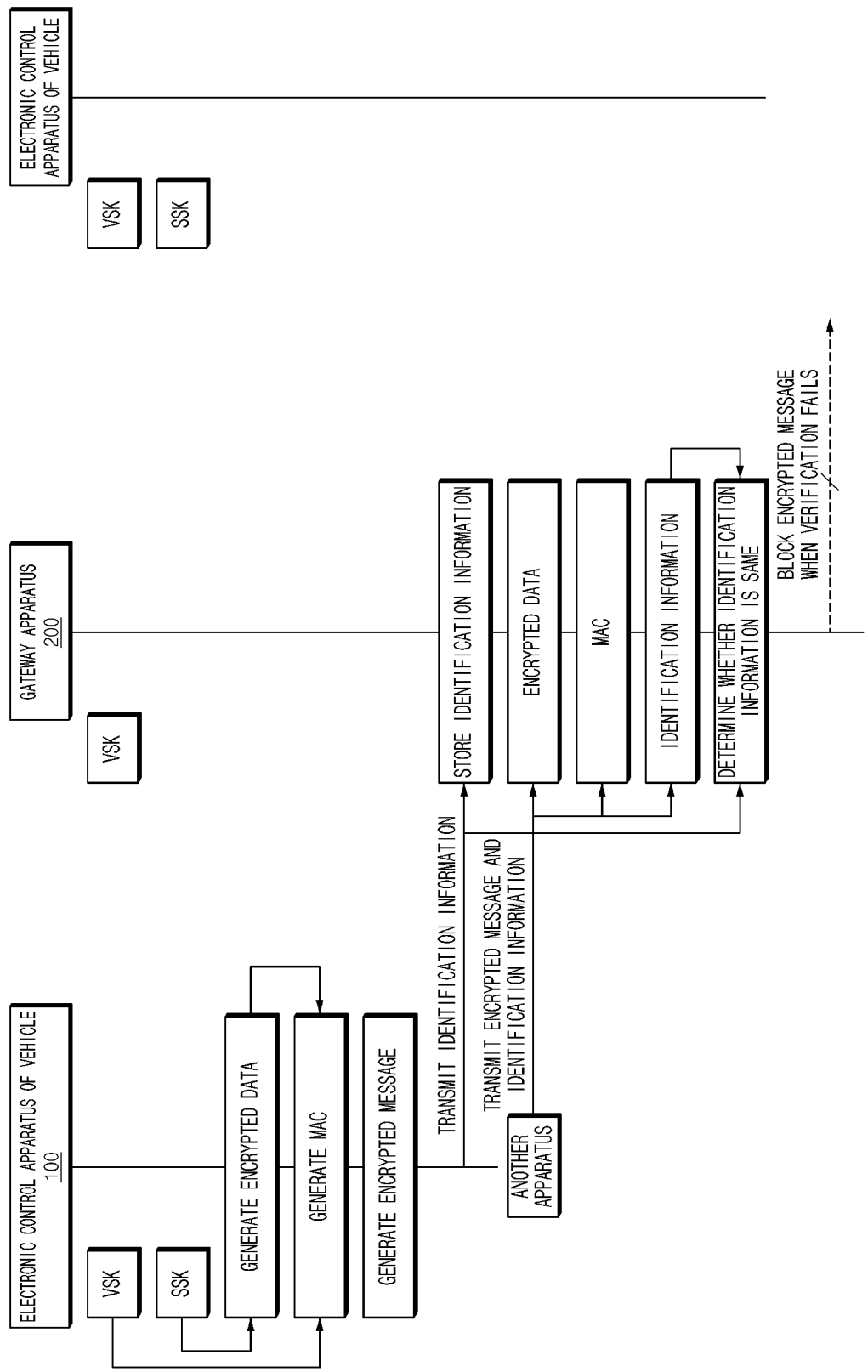
FIG. 3 is a view illustrating a response procedure for an encrypted message received from another device of a vehicle, according to an embodiment disclosed in the specification.

FIG. 3 is a view illustrating a response procedure for an encrypted message received from another device of a vehicle, according to an embodiment disclosed in the specification.

In FIG. 3, the electronic control apparatus 100 of the vehicle 1000 may generate encrypted data by using a SSK, and may generate a MAC by using encrypted data and a VSK The electronic control apparatus 100 of the vehicle 1000 may generate an encrypted message including encrypted data and a MAC and may transmit identification information about the encrypted message.

Referring to FIG. 3, the gateway apparatus 200 may receive an encrypted message and identification information of the encrypted message from another device. Afterward, the gateway apparatus 200 may determine whether pre-stored identification information is the same as identification information received from the other device. When the verification fails because the identification information is not the same, the gateway apparatus 200 may block the routing of an encrypted message received from the other device.

Figure 4:
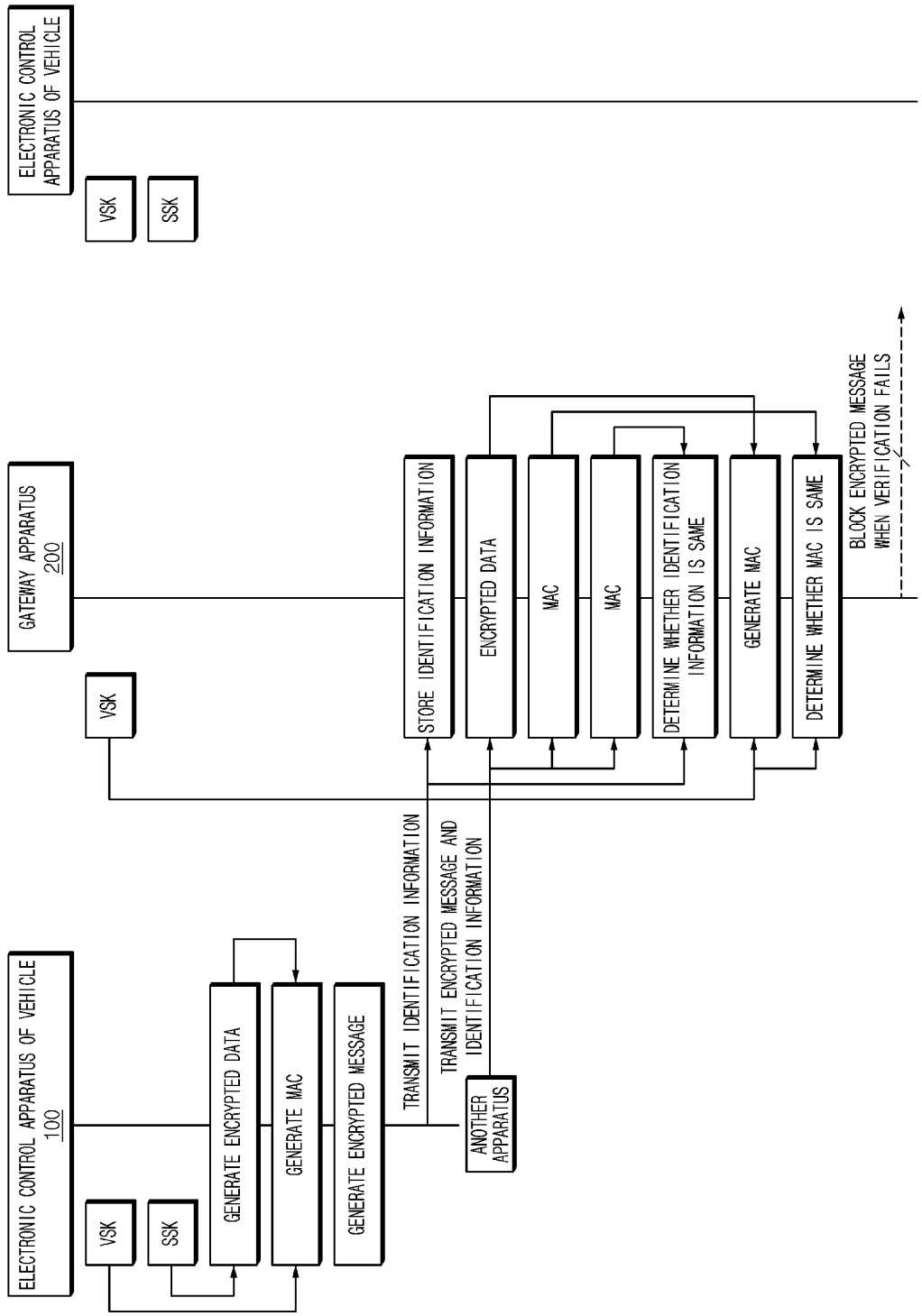
FIG. 4 is a view illustrating a response procedure for an encrypted message received from another device of a vehicle, according to another embodiment disclosed in the specification.

FIG. 4 is a view illustrating a response procedure for an encrypted message received from another device of a vehicle, according to another embodiment disclosed in the specification.

In FIG. 4, the electronic control apparatus 100 of the vehicle 1000 may generate encrypted data by using a SSK, and may generate a MAC by using encrypted data and a VSK The electronic control apparatus 100 of the vehicle 1000 may generate an encrypted message including encrypted data and a MAC and may transmit identification information about the encrypted message.

Referring to FIG. 4, the gateway apparatus 200 may receive an encrypted message and identification information of the encrypted message from another device. Afterward, the gateway apparatus 200 may determine whether pre-stored identification information is the same as identification information received from the other device, and then may generate a MAC by using the VSK and the encrypted data.

The gateway apparatus 200 may determine whether the MAC received from the electronic control apparatus 100 of the vehicle 1000 is the same as the generated MAC. Afterward, when the verification fails because the MAC is not the same, the gateway apparatus 200 may block the routing of an encrypted message received from the other device.

As described above, the vehicle 1000 according to an embodiment disclosed in the specification may allocate a separate CAN ID to the encrypted message, and may add a MAC to a VSK, which will be used for a common purpose within the vehicle 1000. Accordingly, the vehicle 1000 may trust encrypted unknown messages as the vehicle 1000 allows the routing when the verification is successful.

Also, the vehicle 1000 may block the routing of attack messages having a specific CAN ID, which is disguised as a normal message, by adding a MAC to the encrypted message.

Hereinafter, operations and configurations of the electronic control apparatus 100 of the vehicle 1000 and a gateway apparatus 200 that constitute the vehicle 1000 will be described in detail.

First of all, an operation of the electronic control apparatus 100 of the vehicle 1000 will be described with reference to FIG. 5.

Figure 5:
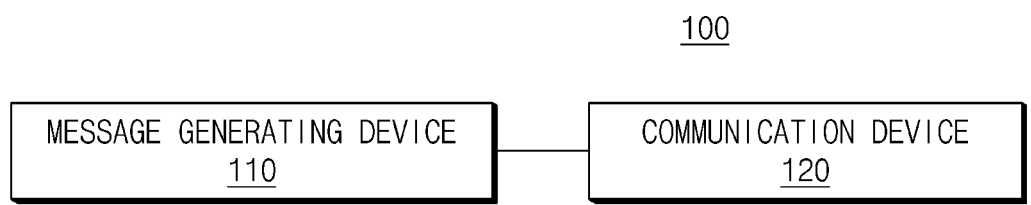
FIG. 5 is a block diagram illustrating an electronic control apparatus of a vehicle, according to an embodiment of the present disclosure.

FIG. 5 is a block diagram illustrating an electronic control apparatus of a vehicle, according to an embodiment of the present disclosure.

Referring to FIG. 5, the electronic control apparatus 100 of the vehicle 1000 may include a message generating device 110 and a communication device 120.

The message generating device 110 may encrypt data by using a first key. Herein, the first key may be a SSK, which is a secret key shared by only the corresponding electronic control apparatuses that transmit and receive data.

For example, the message generating device 110 may encrypt data by using the SSK The message generating device 110 may generate a MAC by using the encrypted data and a second key different from the first key. Herein, the MAC may be defined as information transmitted together with a message to verify message integrity and message authentication. The message integrity indicates that the transmitted message is not changed. The message authentication indicates that the transmitted message comes from the correct sender.

Herein, the second key may be a VSK that is a vehicle shared key shared by all electronic control apparatuses in the vehicle 1000.

For example, the message generating device 110 may generate a MAC of encryption data by using the VSK and the encryption data obtained from an encrypted message.

For example, the message generating device 110 may generate a MAC in a form of HMAC generated by entering the encrypted message and a VSK into a hash function or CMAC generated by entering a message and VSK into a symmetric key algorithm.

The message generating device 110 may generate the encrypted message including the encrypted data and the MAC generated by using the encrypted data.

The message generating device 110 may generate the encrypted message so as to further include counter information.

Herein, the counter may be defined as a register or a memory device used to indicate the number of times that a specific event occurs. When the next input signal or input pulse is received in an existing state, the counter may memorize a new value by increasing an existing value by 1.

For example, the message generating device 110 may increase a counter value by one whenever a message is transmitted, by further including the counter information in the encrypted message.

The communication device 120 may transmit, to another device, an encrypted message and identification information corresponding to the encrypted message. Herein, the identification information corresponding to the encrypted message may be, for example, a CAN ID that is the ID of a CAN message.

Hereinafter, an operation of the gateway apparatus 200 will be described with reference to FIG. 6.

Figure 6:
FIG. 6 is a block diagram illustrating a gateway apparatus, according to an embodiment disclosed in the specification.

FIG. 6 is a block diagram illustrating a gateway apparatus 200, according to an embodiment disclosed in the specification.

Referring to FIG. 6, the gateway apparatus 200 may include a communication device 210, a determination device 220, and a message processor 230.

The communication device 210 may receive an encrypted message including encrypted data and MAC and identification information corresponding to the encrypted message. Herein, the identification information corresponding to the encrypted message may be, for example, a CAN ID that is the ID of a CAN message.

Herein, the encrypted message further includes counter information.

The determination device 220 may determine whether identification information of the received encryption data is the same as pre-stored identification information.

When determining that the identification information of the received encryption data is different from the pre-stored identification information, the determination device 220 may block the routing of the encrypted message.

The determination device 220 may generate a MAC by using pre-stored third key and encryption data obtained from the encrypted message. Herein, the third key may be, for example, a VSK that is a vehicle shared key shared by all electronic control apparatuses in the vehicle 1000.

The determination device 220 may generate, for example, an HMAC for entering an encrypted message and a VSK into a hash function. Alternatively, the determination device 220 may generate CMAC by entering an encrypted message and a VSK into a symmetric key algorithm.

The determination device 220 may determine whether the generated MAC and is the same as a MAC obtained from the encrypted message.

The determination device 220 may determine whether a counter value of the received encrypted message is greater than a counter value of a previously-received encrypted message.

For example, when determining that the counter value of the received encrypted message is not greater than the counter value of the previously-received encrypted message, the determination device 220 may determine that the encrypted message is an intrusion signal for eavesdropping the MAC of the encrypted message, which is previously transmitted to the gateway apparatus 200, and then the message processor 230 may block routing.

The message processor 230 may route the encrypted message based on the determination result of the determination device 220.

When determination device 220 determines that the generated MAC is different from the MAC obtained from the encrypted message, the message processor 230 may block the routing of the encrypted message.

When determination device 220 determines that the generated MAC is the same as the MAC obtained from the encrypted message, the message processor 230 may route the encrypted message.

Herein, the routing may be defined as a process of selecting an optimal path for transmitting given data at the shortest distance or during the shortest time when communication data is transmitted within a network.

When the determination device 220 determines that the counter value included in the encrypted message is greater than the counter value corresponding to the pre-stored identification information, the message processor 230 may route the encrypted message. When the routing is completed, the message processor 230 may increase the counter information.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

In accordance with an electronic control apparatus of a vehicle, a gateway device, and a vehicle including them according to an embodiment disclosed in the specification, it is possible to determine whether to allow or block the routing of an encrypted message by verifying the encrypted message even without a process of decrypting the encrypted message.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A vehicle, comprising:
an electronic control apparatus of the vehicle including a processor and configured to encrypt data, to generate an encrypted message including the encrypted data and a message authentication code (MAC) of the encrypted data, and to transmit the encrypted message and identification information corresponding to the encrypted message to another apparatus; and a gateway apparatus including a processor and configured to receive the encrypted message and the identification information, to determine whether the identification information is identical to pre-stored identification information, to generate the MAC of the encrypted data, to determine whether the generated MAC is identical to the MAC obtained from the encrypted message, and to route the encrypted message based on the determination result.

2. The vehicle of claim 1, wherein the electronic control apparatus of the vehicle generates the encrypted message so as to further include counter information.

3. The vehicle of claim 1, wherein the gateway apparatus blocks routing of the encrypted message when the gateway apparatus determines that the identification information is different from the pre-stored identification information.

4. The vehicle of claim 1, wherein the gateway apparatus blocks routing of the encrypted message when the gateway apparatus determines that the generated MAC is different from the MAC obtained from the encrypted message.

5. The vehicle of claim 1, wherein the gateway apparatus routes the encrypted message when the gateway apparatus determines that the generated MAC is identical to the MAC obtained from the encrypted message.

6. An electronic control apparatus of a vehicle, the electronic control apparatus comprising:

a message generating device including a processor configured to:
  encrypt data by using a first key, and
  generate an encrypted message including the encrypted data and a message authentication code (MAC) generated by using the encrypted data and a second key different from the first key; and a communication device including a processor configured to transmit the encrypted message and identification information corresponding to the encrypted message to another apparatus.

7. The electronic control apparatus of claim 6, wherein the first key is a shared secret key (SSK) with the another apparatus, and wherein the second key is a vehicle shared key (VSK).

8. The electronic control apparatus of claim 6, wherein the message generating device generates the encrypted message so as to further include counter information.

9. A gateway apparatus comprising:

a communication device including a processor configured to receive an encrypted message including encrypted data and a message authentication code (MAC) and identification information corresponding to the encrypted message;

a determination device including a processor configured to:
  determine whether the identification information is identical to pre-stored identification information,
  generate a MAC by using a pre-stored third key and the encrypted data obtained from the encrypted message, and
  determine whether the generated MAC is identical to the MAC obtained from the encrypted message; and a message processor configured to route the encrypted message based on the determination result of the determination device.

10. The gateway apparatus of claim 9, wherein the third key is a vehicle shared key (VSK).

11. The gateway apparatus of claim 9, wherein the message processor blocks routing of the encrypted message when the determination device determines whether the identification information is different from the pre-stored identification information.

12. The gateway apparatus of claim 9, wherein the message processor blocks routing of the encrypted message when the determination device determines whether the generated MAC is different from the MAC obtained from the encrypted message.

13. The gateway apparatus of claim 9, wherein the message processor routes the encrypted message when the determination device determines whether the generated MAC is identical to the MAC obtained from the encrypted message.

14. The gateway apparatus of claim 9, wherein the encrypted message further includes counter information.

15. The gateway apparatus of claim 14, wherein the message processor routes the encrypted message and increases the counter information when the determination device determines whether a counter value included in the encrypted message is greater than a counter value corresponding to the pre-stored identification information.

* * * * *